US011394571B2

United States Patent
Homma et al.

(10) Patent No.: US 11,394,571 B2
(45) Date of Patent: Jul. 19, 2022

(54) NOTIFICATION DEVICE AND NOTIFICATION METHOD

(71) Applicant: Nippon Telegraph and Telephone Corporation, Tokyo (JP)

(72) Inventors: Shunsuke Homma, Tokyo (JP); Shinya Kawano, Tokyo (JP); Hideo Tsuchiya, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/264,001

(22) PCT Filed: Jul. 30, 2019

(86) PCT No.: PCT/JP2019/029908
§ 371 (c)(1),
(2) Date: Jan. 28, 2021

(87) PCT Pub. No.: WO2020/027160
PCT Pub. Date: Feb. 6, 2020

(65) Prior Publication Data
US 2021/0297276 A1  Sep. 23, 2021

(30) Foreign Application Priority Data
Aug. 2, 2018 (JP) .............................. JP2018-146222

(51) Int. Cl.
*H04L 12/18* (2006.01)
*H04L 12/46* (2006.01)
(52) U.S. Cl.
CPC ...... *H04L 12/1859* (2013.01); *H04L 12/4641* (2013.01)

(58) Field of Classification Search
CPC ...................... H04L 12/1859; H04L 12/4641
USPC ....................................................... 709/231
See application file for complete search history.

(56) References Cited

U.S. PATENT DOCUMENTS

| | | | | |
|---|---|---|---|---|
| 8,437,355 | B1 * | 5/2013 | Goodson | H04B 10/27 370/395.4 |
| 8,804,720 | B1 * | 8/2014 | Rainovic | H04L 12/2889 370/390 |
| 8,937,858 | B2 * | 1/2015 | Shah | H04L 47/15 370/230 |
| 9,450,817 | B1 * | 9/2016 | Bahadur | H04L 41/0806 |
| 9,509,598 | B2 * | 11/2016 | Hassan | H04L 12/437 |

(Continued)

OTHER PUBLICATIONS

Huadong Ma and K. G. Shin, "Performance analysis of the interactivity for multicast true VoD service," Proceedings Tenth International Conference on Computer Communications and Networks (Cat. No. 01EX495), 2001, pp. 535-538, doi: 10.1109/ICCCN.2001.956318. (Year: 2001).*

(Continued)

*Primary Examiner* — Melvin H Pollack
(74) *Attorney, Agent, or Firm* — Fish & Richardson P.C.

(57) ABSTRACT

An MDF (10) receives MLDv2 received by vCPE (20) that is connected to CPE (50) via a tunnel. When the MLDv2 is received, the MDF (10) determines an edge router (30) that accommodates the CPE (50) being a transmission source of the MLDv2. Then, the MDF (10) instructs the determined edge router (30) to perform copy distribution of contents to the CPE (50) being the transmission source of the MLDv2.

6 Claims, 14 Drawing Sheets

(56) References Cited

U.S. PATENT DOCUMENTS

| | | | | |
|---|---|---|---|---|
| 10,277,353 | B1* | 4/2019 | Grammel | H04J 14/0272 |
| 10,348,621 | B2* | 7/2019 | Bays | H04L 49/70 |
| 10,355,989 | B1* | 7/2019 | Panchal | H04L 67/10 |
| 11,212,159 | B2* | 12/2021 | Fargano | H04L 41/5096 |
| 2009/0263139 | A1* | 10/2009 | Liu | H04L 65/1026 |
| | | | | 398/135 |
| 2011/0051597 | A1* | 3/2011 | Cohen | H04L 61/6022 |
| | | | | 370/221 |
| 2011/0116796 | A1* | 5/2011 | Zheng | H04W 52/02 |
| | | | | 398/45 |
| 2011/0235635 | A1* | 9/2011 | Yadav | H04L 12/18 |
| | | | | 370/390 |
| 2011/0307588 | A1* | 12/2011 | Thyni | H04L 41/0893 |
| | | | | 709/222 |
| 2012/0275784 | A1* | 11/2012 | Soto | H04Q 11/0067 |
| | | | | 398/38 |
| 2015/0036483 | A1* | 2/2015 | Hassan | H04L 45/50 |
| | | | | 370/223 |
| 2015/0124615 | A1* | 5/2015 | Spector | H04L 43/0882 |
| | | | | 370/235 |
| 2015/0207677 | A1* | 7/2015 | Choudhury | H04L 47/12 |
| | | | | 370/254 |
| 2015/0237667 | A1* | 8/2015 | Ghai | H04L 67/10 |
| | | | | 370/338 |
| 2015/0270988 | A1* | 9/2015 | Finkelstein | H04L 12/2898 |
| | | | | 370/401 |
| 2015/0295774 | A1* | 10/2015 | Pugaczewski | H04L 41/12 |
| | | | | 370/254 |
| 2015/0372973 | A1* | 12/2015 | Lopez da Silva | H04L 12/2856 |
| | | | | 370/254 |
| 2016/0286417 | A1* | 9/2016 | Joe | H04L 41/0886 |
| 2017/0111274 | A1* | 4/2017 | Bays | H04L 49/70 |
| 2017/0180439 | A1* | 6/2017 | Van Bogaert | H04L 67/1097 |
| 2017/0310655 | A1* | 10/2017 | Sethi | H04L 9/0844 |
| 2017/0359443 | A1* | 12/2017 | Wei | G06F 9/46 |
| 2017/0366400 | A1* | 12/2017 | Madaiah | H04W 76/12 |
| 2018/0295156 | A1* | 10/2018 | Kolbe | H04L 12/4604 |
| 2018/0351862 | A1* | 12/2018 | Jeganathan | H04L 45/586 |
| 2018/0376338 | A1* | 12/2018 | Ashrafi | H04W 16/10 |
| 2019/0104087 | A1* | 4/2019 | Singarayan | H04L 49/15 |
| 2019/0306057 | A1* | 10/2019 | Barzegar | H04B 3/52 |
| 2019/0387039 | A1* | 12/2019 | Han | H04L 65/601 |
| 2019/0394533 | A1* | 12/2019 | Chakraborty | H04N 21/4756 |
| 2020/0007905 | A1* | 1/2020 | Han | H04N 21/44008 |
| 2020/0037035 | A1* | 1/2020 | Kaufman | H04N 21/252 |

OTHER PUBLICATIONS

Y. Xiao, X. Du, J. Zhang, F. Hu and S. Guizani, "Internet Protocol Television (IPTV): The Killer Application for the Next-Generation Internet," in IEEE Communications Magazine, vol. 45, No. 11, pp. 126-134, Nov. 2007, doi: 10.1109/MCOM.2007.4378332. (Year: 2007).*

L.-C. Yeh, C.-S. Wang, C.-Y. Lin and J.-S. Chen, "An innovative application overcommunications-asa-service: Network-based multicast IPTV audience measurement," 2011 13th Asia-Pacific Network Operations and Management Symposium, 2011, pp. 1-7, doi: 10.1109/APNOMS.2011.6077040. (Year: 2011).*

L. Alchaal, A. El-sayed, V. Roca and M. Habert, "A VPRN solution for fully secure and efficient group communications," Proceedings of the Eighth IEEE Symposium on Computers and Communications. ISCC 2003, 2003, pp. 473-478 vol. 1, doi: 10.1109/ISCC.2003.1214163. (Year: 2003).*

Claudio Imbrenda, Luca Muscariello, and Dario Rossi. 2014. Analyzing cacheable traffic in isp access networks for micro cdn applications via content-centric networking. Proceedings of the 1st ACM Conference on Information-Centric Networking (ACM-ICN '14). Association for Computing Machinery, 57-66. (Year: 2014).*

L. Peterson et al., "Central office re-architected as a data center," in IEEE Communications Magazine, vol. 54, No. 10, pp. 96-101, Oct. 2016, doi: 10.1109/MCOM.2016.7588276. (Year: 2016).*

K. J. Kerpez, J. M. Cioffi, G. Ginis, M. Goldburg, S. Galli and P. Silverman, "Software-defined access networks," in IEEE Communications Magazine, vol. 52, No. 9, pp. 152-159, Sep. 2014, doi: 10.1109/MCOM.2014.6894466. (Year: 2014).*

R. L. Da Silva, M. A. C. Fernández, L. E. I. Gamir and M. F. Pérez, "Home routing gateway virtualization: An overview on the architecture alternatives," 2011 Future Network & Mobile Summit, 2011, pp. 1-9. (Year: 2011).*

T. Cruz, P. Simões, N. Reis, E. Monteiro, F. Bastos and A. Laranjeira, "An architecture for virtualized home gateways," 2013 IFIP/IEEE International Symposium on Integrated Network Management (IM 2013), 2013, pp. 520-526. (Year: 2013).*

[No Author Listed], "Network Functions Virtualisation (NFV) Use Cases," ETSI GS NFV 001, Oct. 2013, 50 pages.

Farinacci et al., "Anycast-RP Using Protocol Independent Multicast (PIM)," Network Working Group, Aug. 2006, 12 pages.

Vida et al., "Multicast Listener Discovery Version 2 (MLDv2) for IPv6," Network Working Group, Jun. 2004, 62 pages.

* cited by examiner

| CHANNEL | NUMBER OF VIEWERS |
|---|---|
| A | 10 |
| B | 20 |
|  |  |

NOTIFICATION DEVICE AND NOTIFICATION METHOD

CROSS-REFERENCE TO RELATED APPLICATIONS

This application is a National Stage application under 35 U.S.C. § 371 of International Application No. PCT/JP2019/029908, having an International Filing Date of Jul. 30, 2019, which claims priority to Japanese Application Serial No. 2018-146222, filed on Aug. 2, 2018. The disclosure of the prior application is considered part of the disclosure of this application, and is incorporated in its entirety into this application.

TECHNICAL FIELD

The present disclosure relates to a reporting apparatus and a reporting method.

BACKGROUND ART

Virtual Customer Premises Equipment (vCPE) technology, whereby a function of Customer Premises Equipment (CPE) that has hitherto been installed on a user's premises is provided in a general-purpose server installed in a network of a telecommunications carrier, has been known.

As a means of implementing such vCPE, the following method has been under study: CPE that has minimum necessary functions such as tunneling and Zero Touch Provisioning (ZTP) is deployed on a user's premises, and vCPE that is deployed in a network of a telecommunications carrier performs service processing that has hitherto been performed on the user's premises. Here, the CPE and the vCPE are connected via a tunnel, and all the user traffic is transferred to the vCPE, through the tunnel.

Further, in recent years, services that require download of contents via a network such as the Internet are becoming more and more common. Examples of such contents include videos, that is, large-volume data. Consequently, downloading contents uses a wide range of bands because of transmission of such large-volume data, and thus requires a large network load. In the light of this, there is a technique of distributing the network load by using a multicast distribution method at the time of downloading contents.

The multicast distribution method includes an edge copy distribution method and an Optical Line Terminal (OLT) copy distribution method. The edge copy distribution method is a method in which an edge copies packets and distributes the packets to a user who has submitted a viewing request. In the edge copy distribution method, a channel having no viewers is not distributed, and thus has high use efficiency of a band for a low-rating channel in comparison with the OLT copy distribution method.

The OLT copy distribution method is a method in which an OLT broadcasts packets and distribution is performed by controlling filters of Optical Network Units (ONUs). In the OLT copy distribution method, double transmission does not occur between an edge router and an OLT regarding a high-rating channel, and thus has high use efficiency of a band for a high-rating channel in comparison with the edge copy distribution method.

CITATION LIST

Non Patent Literature

NPL 1: "Network Functions Virtualisation (NFV) Use Cases", [online], [searched on Jul. 11, 2018], Internet <https://www.etsi.org/deliver/etsi_gs/NFV/001_099/001/01.01.01_60/gs_NFV001v010101p.pdf>

NPL 2: "Multicast Listener Discovery Version 2 (MLDv2) for IPv6", [online], [searched on Jul. 11, 2018], Internet <https://tools.ietf.org/html/rfc3810>

NPL 3: "Anycast-RP Using Protocol Independent Multicast (PIM)", [online], [searched on Jul. 11, 2018], Internet https://tools.ietf.org/html/rfc4610

SUMMARY OF THE INVENTION

Technical Problem

However, in the conventional vCPE methods described above, when the vCPE is deployed in a core network or at a stage higher than the core network, user traffic is transferred through a tunnel to the core network that is located on the upstream side of the edge. This causes viewing requests to be transferred directly to stages higher than the OLT and the edge each of which serves as a copy point, preventing the viewing, requests from being recognized in the OLT and the edge. This has hitherto been posing a problem of hindering efficient distribution of contents.

Means for Solving the Problem

To solve the problem described above and achieve an object, a reporting apparatus according to the present disclosure includes a reception unit configured to receive a multicast viewing request received by virtual CPE connected to CPE via a tunnel, a determination unit configured to determine a communication device accommodating the CPE being a transmission source of the multicast viewing request, when the multicast viewing request is received by the reception unit, and an instruction unit configured to instruct the communication device determined by the determination unit to perform copy distribution of contents to the CPE being the transmission source of the multicast viewing request.

A reporting method according to the present disclosure is a reporting method executed by a reporting apparatus, the reporting method including receiving a multicast viewing request received by virtual CPE connected to CPE via a tunnel; determining a communication device accommodating the CPE being a transmission source of the multicast viewing request, when the multicast viewing request is received in the receiving, and instructing the communication device determined in the determining to perform copy distribution of contents to the CPE being the transmission source of the multicast viewing request.

Effects of the Invention

According to the present disclosure, an effect of enabling efficient multicast distribution of contents can be exerted.

DESCRIPTION OF EMBODIMENTS

Embodiments of a reporting apparatus and a reporting method according to the present application will be described below in detail with reference to the drawings. Note that the embodiments by no means limit the reporting apparatus and the reporting method according to the present application.

First Embodiment

In the following embodiment, a description will be sequentially given to a configuration of a communication system, a configuration of a reporting apparatus, and procedures of processing performed in the reporting apparatus according to the first embodiment, and effects of the first embodiment will be described at the end.

Configuration of Communication System

Figure 1:
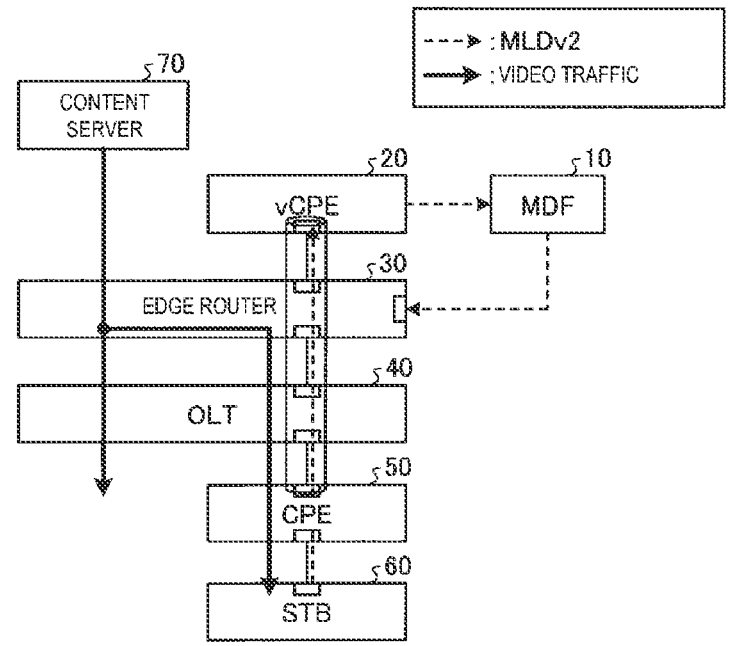
FIG. 1 is a diagram illustrating one example of a configuration of a communication system according to a first embodiment.

First, with reference to FIG. 1, a communication system according to the first embodiment will be described. FIG. 1 is a diagram illustrating one example of a configuration of the communication system according to the first embodiment. The communication system according to the first embodiment includes an MLD Delivery Function (MDF) 10, vCPE 20, an edge router 30, an OLT 40, CPE 50, a Set Top Box (STB) 60, and a content server 70. Note that the numbers of the respective apparatuses illustrated in FIG. 1 are merely examples, and the numbers are not limited to the illustrated numbers.

The MDF 10 receives Multicast Listener Discovery Version 2 (MLDv2) from the vCPE 20. The MDF 10 determines the edge router 30 that accommodates the CPE 50, a physical port of the edge router 30, and VALN information assigned to the CPE 50, based on information (for example, an IP address and a MAC address) of the vCPE 20 that has transferred the MLDv2 (MLDv2 message), and instructs the edge router 30 to distribute contents to the CPE 50.

The vCPE 20 is virtual CPE that is deployed in a telecommunications carrier. In short, the vCPE 20 has a function that has hitherto been provided in CPE, and the vCPE 20 that is deployed in a network of the telecommunications carrier performs service processing that has hitherto been performed on a user's premises. The vCPE 20 is connected to the CPE 50 via a tunnel, and for example, receives MLDv2 being a multicast viewing request for contents from the CPE 50.

The edge router 30 is a router that can perform distribution of copy traffic by specifying a port, according to the details of the MLDv2 message. When the edge router 30 receives an instruction to distribute contents from the MDF 10 to the CPE 50, the edge router 30 copies packets that are distributed from the content server 70 and distributes contents to the STB 60 of the user who has submitted the viewing request.

The OLT 40 is a station-side terminating apparatus, and is a repeating apparatus that accommodates the CPE 50. The OLT 40 transfers packets of a user terminal encapsulated by the CPE 50 to the vCPE 20. The CPE 50 is an apparatus that is connected to the vCPE 20 via a tunnel and is installed on a user's premises. The CPE 50 transfers all the user traffic to the vCPE 20 through a tunnel. The STB 60 is an apparatus that receives a broadcast signal for cable television broadcasting, satellite broadcasting, terrestrial television broadcasting, or IP broadcasting, for example. The STB 60 transmits MLDv2 to the CPE 50.

Configuration of MDF

Figure 2:
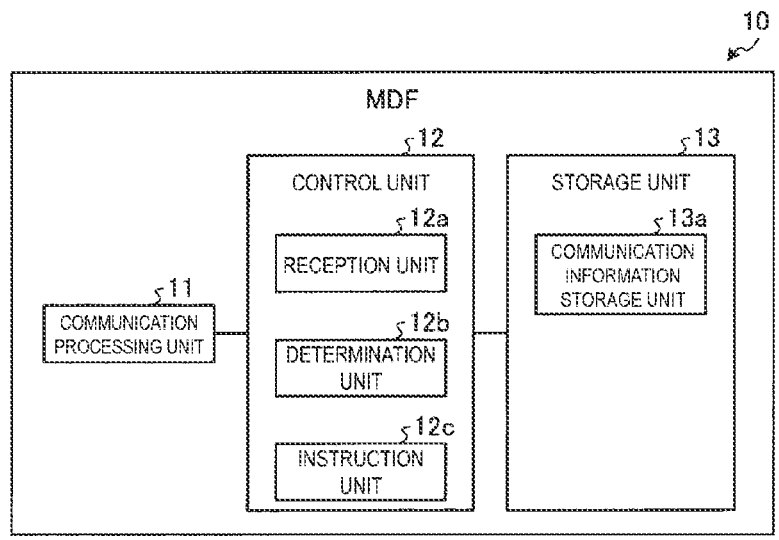
FIG. 2 is a block diagram illustrating a configuration example of an MDF according to the first embodiment.

Next, with reference to FIG. 2, a configuration of the MDF 10 illustrated in FIG. 1 will be described. FIG. 2 is a block diagram illustrating a configuration example of the MDF according to the first embodiment. As illustrated in FIG. 2, the MDF 10 includes a communication processing unit 11, a control unit 12, and a storage unit 13. Processing performed by each unit of the MDF 10 will be described below.

The communication processing unit 11 controls communication related to various pieces of information that are exchanged with an apparatus to be connected. For example, the communication processing unit 11 receives MLDv2 from the vCPE 20.

The storage unit 13 stores data and programs that are necessary for the control unit 12 to perform various types of processing. The storage unit 13 includes a communication information storage unit 13a as an entity closely related to the present disclosure in particular. For example, the storage unit 13 is a random access memory (RAM), a semiconductor memory element such as a flash memory, or a storage apparatus such as a hard disk and an optical disc.

The communication information storage unit 13a stores information related to other devices such as the vCPE 20, the edge router 30, the OLT 40, and the CPE 50. For example, the communication information storage unit 13a stores information of the CPE 50 associated with the vCPE 20, information of the CPE 50 accommodated by the edge router 30, information of a physical port of the edge router, and information of a VLAN assigned to the CPE 50.

The control unit 12 has an internal memory for storing a program and required data that define various processing procedures and the like and execute various types of processing using the programs and the data. The control unit 12 includes a reception unit 12a, a determination unit 12b, and an instruction unit 12c as entities closely related to the present disclosure in particular. Here, the control unit 12 is an electronic circuit such as a Central Processing Unit (CPU) or a Micro Processing Unit (MPU), or an integrated circuit such as an Application Specific Integrated Circuit (ASIC) or a Field Programmable Gate Array (FPGA).

The reception unit 12a receives MLDv2 being a multicast viewing request that is received by the vCPE 20 connected to the CPE 50 via a tunnel. In other words, the reception unit 12a receives MLDv2 transferred by the vCPE 20.

When the MLDv2 is received by the reception unit 12a, the determination unit 12b determines the edge router 30 that accommodates the CPE 50 being a transmission source of the MLDv2. For example, the determination unit 12b identifies the CPE 50 being the transmission source and a reporting destination of the MLDv2, based on data included in the MLDv2, and thereby determines the edge router 30 that accommodates the CPE 50 being the transmission source of the MLDv2, a physical port of the edge router 30, and VLAN information assigned to the CPE 50.

The instruction unit 12c instructs the edge router 30 that is determined by the determination unit 12b to perform copy distribution of contents to the CPE 50 being the transmission source of the MLDv2. For example, the instruction unit 12c converts a format of the MLDv2 received by the reception unit 12a according to the edge router 30 being a transfer destination, and transfers the converted MLDv2 to the physical port of the edge router 30 that is determined by the determination unit 12b. For example, the instruction unit 12c may transmit, to the edge router 30, related information, such as information of the CPE 50 being the transmission source of the MLDv2, VLAN information assigned to the CPE 50, and information of a reporting destination of the MLDv2.

Figure 3:
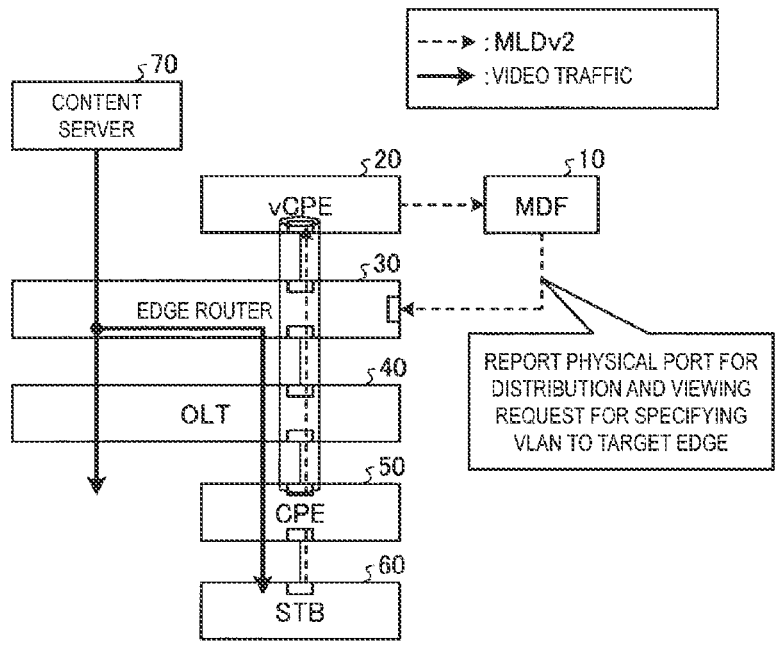
FIG. 3 is a diagram for describing processing for instructing an edge router to perform multicast copy distribution.

Here, with reference to FIG. 3, one example of processing for instructing the edge router 30 to perform multicast copy distribution will be described. FIG. 3 is a diagram for describing processing for instructing the edge router to perform multicast copy distribution. As illustrated in FIG. 3, when the MDF 10 receives MLDv2 from the vCPE 20, the MDF 10 reports, to the edge router 30, a physical port for distribution and a viewing request (MLDv2) for specifying a VLAN. Then, the edge router 30 copies packets and performs distribution to the user who has submitted the viewing request.

Procedures of Processing Performed by MDF

Figure 4:
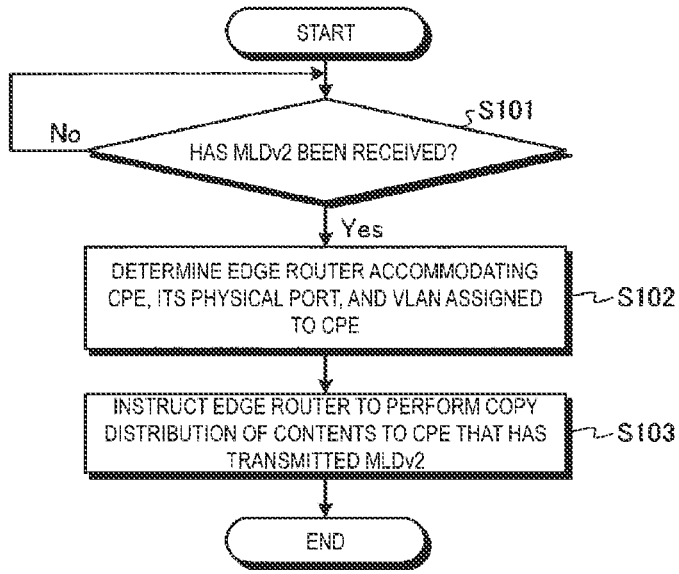
FIG. 4 is a flowchart for describing processing performed by the MDF according to the first embodiment.

Next, with reference to FIG. 4, procedures of processing performed 1w the MDF 10 according to the first embodiment will be described. FIG. 4 is a flowchart for describing the processing performed by the MDF according to the first embodiment.

As illustrated in FIG. 4, when the reception unit 12a of the MDF 10 receives MLDv2 being a multicast viewing request that is received by the vCPE 20 (Yes in Step S101), the determination unit 12b determines the edge router 30 that accommodates the CPE 50 being a transmission source of the MLDv2, a physical port of the edge router 30, and VLAN information assigned to the CPE 50 (Step S102).

Then, in the MDF 10, the instruction unit 12c instructs the edge router 30 that is determined by the determination unit 12b to perform copy distribution of contents to the CPE 50 being the transmission source of the MLDv2 (Step S103). For example, the instruction unit 12c converts a format of the MLDv2 received by the reception unit 12a according to the edge router 30 being a transfer destination, and transfers the converted MLDv2 to the physical port of the edge router 30 that is determined by the determination unit 12b.

Effects of First Embodiment

As described above, the MDF 10 according to the first embodiment receives MLDv2 that is received by the vCPE 20 connected to the CPE 50 via a tunnel, and when the MLDv2 is received, the MDF 10 determines the edge router 30 that accommodates the CPE 50 being a transmission source of the MLDv2. Then, the MDF 10 instructs the determined edge router 30 to perform copy distribution of contents to the CPE 50 being the transmission source of the MLDv2. Accordingly, efficient multicast distribution of contents can be performed. In other words, the MDF 10 instructs the edge router 30 to perform copy distribution of contents. Thus, contents can be distributed with the edge copy distribution method in which the edge router 30 copies packets and performs distribution to a user who has submitted a viewing request. In other words, distribution of contents can be performed with the edge copy distribution method, and thus use efficiency of a band for a low-rating channel is enhanced. The MDF 10 enables implementation of multicast copy at a stage lower than the vCPE 20 so as to improve transfer efficiency without making any changes to an existing network.

Second Embodiment

In the first embodiment, a case has been described, in which the edge router 30 is instructed to perform copy distribution of contents. However, the present disclosure is not limited to this case. For example, the OLT 40 may be instructed to perform copy distribution of contents.

In the light of this, a case will be described below, in which an MDF 10A according to the second embodiment instructs the OLT 40 to perform copy distribution of contents. Note that a description of the same configuration and processing as those of the communication system according to the first embodiment will be omitted.

Figure 5:
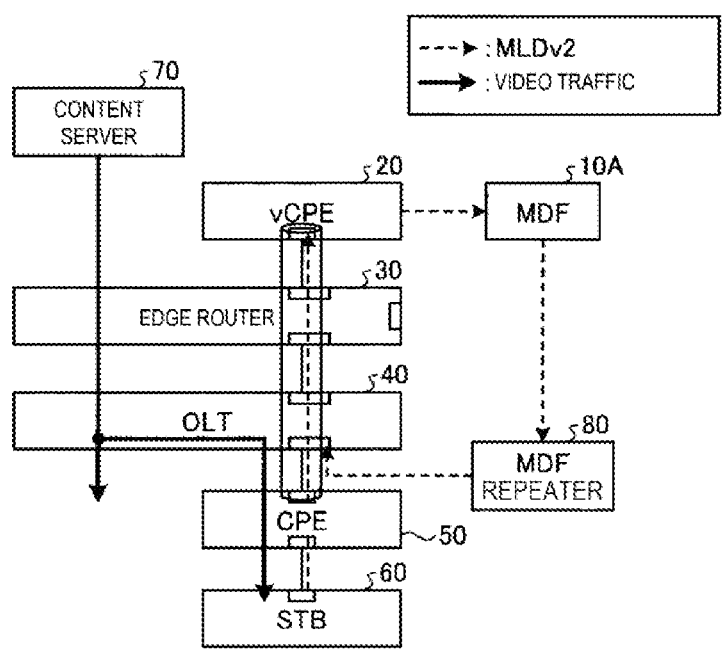
FIG. 5 is a diagram illustrating one example of a configuration of a distribution system according to a second embodiment.

With reference to FIG. 5, a communication system according to the second embodiment will be described. FIG. 5 is a diagram illustrating one example of a configuration of the communication system according to the second embodiment. The communication system according to the second embodiment includes an MDF repeater 80, which is a difference from the communication system according to the first embodiment.

An L2 device such as the OLT 40 starts multicast copy distribution to a port (VLAN) that is used to receive MLDv2. For this reason, the MDF 10A is required to report MLDv2 to the OLT by using an appropriate port. In the communication system according to the second embodiment, the MDF repeater 80 is installed as an MDF repeater connected to each port of the OLT 40.

The MDF 10A instructs, through the MDF repeater 80, the OLT 40 to distribute contents to the CPE 50. Specifically, the MDF 10A reports MLDv2 and related information to the MDF repeater 80 that is connected to the target OLT 40.

When the MDF repeater 80 receives the MLDv2 and the related information from the MDF 10, the MDF repeater 80 reports the MLDv2 to the target OLT 40 through a port appropriate for the target our 40. In other words, the MDF repeater 80 reports the MLDv2 through the port that connects the CPE 50 being a transmission source of the MLDv2 and the target OLT 40.

When the OLT 40 receives the instruction to distribute contents from the MDF 10 to the CPE 50, the OLT 40 copies packets that are distributed from the content server 70, and thereby performs distribution of the contents to the STB 60 of the user who has submitted the viewing request.

Here, processing performed by each unit of the MDF 10A will be described. When MLDv2 is received by the reception unit 12a, the determination unit 12b of the MDF 10A determines the OLT 40 that accommodates the CPE 50 being a transmission source of a multicast viewing request. The instruction unit 12c instructs, through the MDF repeater 80, the OLT 40 that is determined by the determination unit 12b to perform copy distribution of contents to the CPE 50 being the transmission source of the MLDv2.

Figure 6:
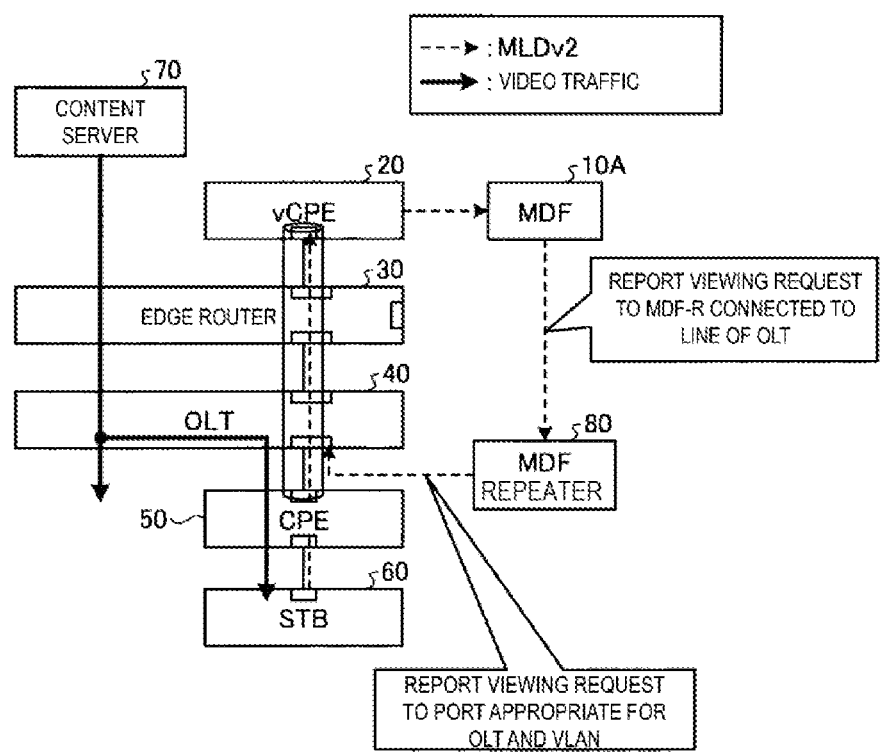
FIG. 6 is a diagram for describing processing for instructing an OLT to perform multicast copy distribution.

Here, with reference to FIG. 6, one example of processing for instructing the OLT 40 to perform multicast copy distribution will be described. FIG. 6 is a diagram for describing processing for instructing the OLT to perform multicast copy distribution. As illustrated in FIG. 6, when the MDF 10A receives MLDv2 from the vCPE 20, the MDF 10A reports the viewing request (MLDv2) to the MDF repeater 80 that is connected to a line of the OLT 40. Then, when the MDF repeater 80 receives the MLDv2 and related information from the MDF 10, the MDF repeater 80 reports the MLDv2 to a target OLT 40 through a port appropriate for the target OLT 40.

In other words, the MDF repeater 80 reports the MLDv2 through the port that connects the CPE 50 being a transmission source of the MLDv2 and the target OLT 40. Subsequently, the OLT 40 copies packets and distributes the packets to the user who has submitted the viewing request by broadcasting the packets to all the ONUs (not illustrated). Note that the OLT 40 performs distribution only to the user who has submitted the viewing request by opening a filter of an ONU of the user who has submitted the viewing request and closing a filter of an ONU of a user who does not intend to receive the distribution.

Figure 7:
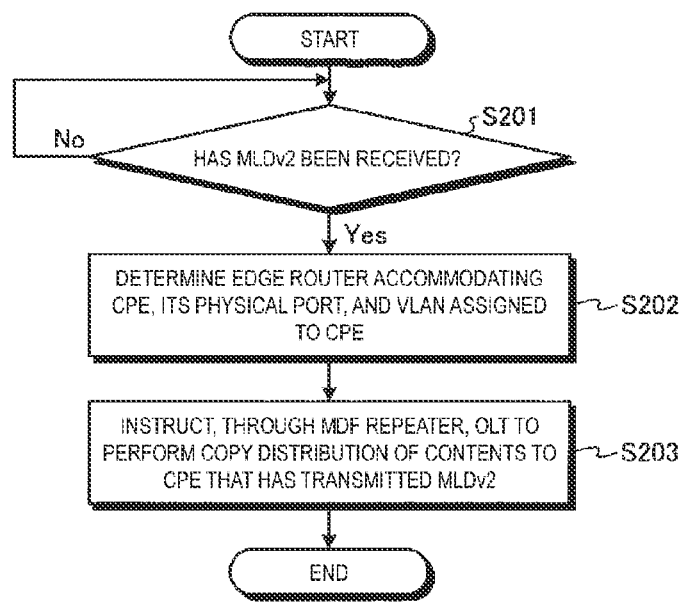
FIG. 7 is a flowchart for describing processing performed by an MDF according to the second embodiment.

Next, with reference to FIG. 7, procedures of processing performed by the MDF 10A according to the second embodiment will be described. FIG. 7 is a flowchart for describing the processing performed by the MDF according to the second embodiment.

As illustrated in FIG. 7, when the reception unit 12a of the MDF 10A receives MLDv2 being a multicast viewing request that is received by the vCPE 20 (Yes in Step S201), the determination unit 12b determines the edge router 30 that accommodates the CPE 50 being a transmission source of the MLDv2, a physical port of the edge router 30, and ULAN information assigned to the CPE 50 (Step S202).

Then, in the MDF 10, the instruction unit 12c instructs, through the MDF repeater 80, a target OLT 40 that is accommodated by the edge router 30 determined by the determination unit 12b to perform copy distribution of contents to the CPE 50 being the transmission source of the MLDv2 (Step S203). For example, in the MDF 10A, the instruction unit 12c reports the MLDv2 and related information to the MDF repeater 80 that is connected to the target OLT 40.

Effects of Second Embodiment

As described above, the MDF 10A according to the second embodiment instructs, through the MDF repeater 80, the OLT 40 to perform copy distribution of contents. Thus, contents can be distributed with the OLT copy distribution method in which the OLT 40 copies packets and performs distribution to the user who has submitted the viewing request. In other words, distribution of contents can be performed with the OLT copy distribution method, and thus double transmission is prevented between the edge router and the OLT. Accordingly, use efficiency of a band for a high-rating channel is enhanced. The MDF 10A enables implementation of multicast copy at a stage lower than the vCPE 20 so as to improve transfer efficiency without making any changes to an existing network.

Third Embodiment

In the first embodiment and the second embodiment described above, cases have been described, in which the edge router 30 is instructed to perform copy distribution of contents and in which the OLT 40 is instructed to perform copy distribution of contents, respectively. However, the present disclosure is not limited to these cases. For example, it may be possible to select which of the edge router 30 and the OLT 40 is to be instructed to perform copy distribution, depending on a state of distributing contents.

In the light of this, a case will be described below, in which an MDF 10B according to the third embodiment selects which of the edge router 30 and the OLT 40 is to be instructed to perform copy distribution, depending on a state of distributing contents. Note that a description of the same configuration and processing as those of the communication system according to the first embodiment will be omitted.

Figure 8:
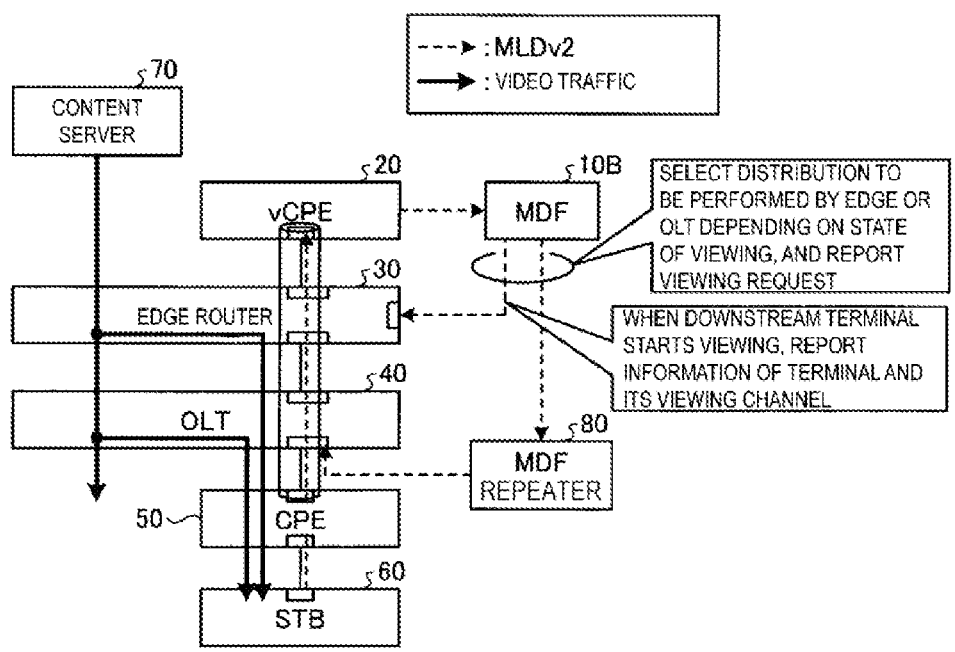
FIG. 8 is a diagram for describing an overview of processing in a distribution system according to a third embodiment.

With reference to FIG. 8, an overview of processing in a distribution system according to the third embodiment will be described. FIG. 8 is a diagram for describing the overview of the processing in the distribution system according to the third embodiment. As illustrated in FIG. 8, when the MDF 10B according to the third embodiment receives MLDv2 from the vCPE 20, the MDF 10B selects by which of the edge router 30 and the OLT 40 copy distribution is to be performed depending on a state of viewing, and reports the viewing request (MLDv2) to the edge router 30 or the OLT 40.

For example, when the MDF 10B receives MLDv2 from the vCPE 20, the MDF 10B acquires information of the CPE 50 associated with the vCPE 20 and the number of viewers of a requested channel in the OLT 40 that accommodates the target CPE. When the number of viewers exceeds a threshold n, the MDF 10B selects copy distribution to be performed by the OLT 40, whereas when the number of viewers does not exceed the threshold n, the MDF 10B selects copy distribution to be performed by the edge router 30.

The edge router 30 is capable of multicast distribution in either of a broadcasting LAN that is established between the edge router 30 and a plurality of pieces of CPE 50 and an individual LAN that is established between the edge router 30 and each CPE 50, and is capable of opening and closing each LAN port according to a request.

Figures 9, 10:
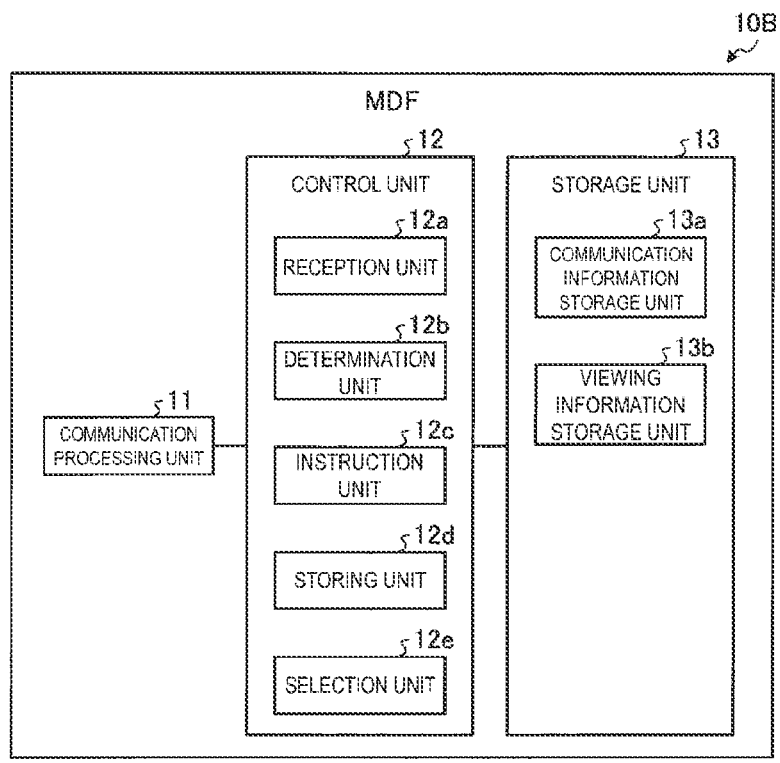
FIG. 9 is a block diagram illustrating a configuration example of an MDF according to the third embodiment.
FIG. 10 is a diagram illustrating one example of a table stored in a viewer information storage unit.

Here, with reference to FIG. 9, a configuration of the MDF 10B illustrated in FIG. 8 will be described. FIG. 9 is a block diagram illustrating a configuration example of the MDF according to the third embodiment. As illustrated in FIG. 9, the MDF 10B includes a storing unit 12d, a selection unit 12e, and a viewing information storage unit 13b, which is a difference from the MDF 10 according to the first embodiment illustrated in FIG. 2.

The viewing information storage unit 13b stores the number of viewers of each channel. For example, as illustrated in FIG. 10, the viewing information storage unit 13b stores a table in which channels and their respective numbers of viewers are associated with each other. FIG. 10 is a diagram illustrating one example of the table stored in the viewer information storage unit.

The storing unit 12d stores states of distributing contents in a plurality of pieces of CPE 50 in the viewing information storage unit 13b by using MLDv2 received by the reception unit 12a. For example, when a viewing request for a channel A is received by the reception unit 12a, the storing unit 12d updates a value of the number of viewers of the channel A stored in the viewing information storage unit 13b by incrementing the number by one.

The selection unit 12e selects which of the edge router and the OLT is to be instructed to perform copy distribution, depending on the state of distributing contents stored in the viewing information storage unit 13b. For example, the selection unit 12e acquires, from the viewing information storage unit 13b, the number of viewers of a requested channel in the OLT 40 that accommodates the CPE 50 being a transmission source of the MLDv2. When the number of viewers exceeds a threshold n, the selection unit 12e selects copy distribution to be performed by the OLT 40, whereas when the number of viewers does not exceed the threshold n, the selection unit 12e selects copy distribution to be performed by the edge router 30.

Based on the MLDv2 received by the reception unit 12a, the determination unit 12b determines the edge router 30 that accommodates the CPE 50 being the transmission source of the MLDv2 when the edge router 30 is selected by the selection unit 12e and determines the OLT 40 that accommodates the CPE 50 being the transmission source of the MLDv2 when the OLT 40 is selected by the selection unit 12e.

The instruction unit 12c instructs the edge router 30 or the OLT 40 that is determined by the determination unit 12b to perform copy distribution of contents to the CPE 50 being the transmission source of the MLDv2.

Figure 11:
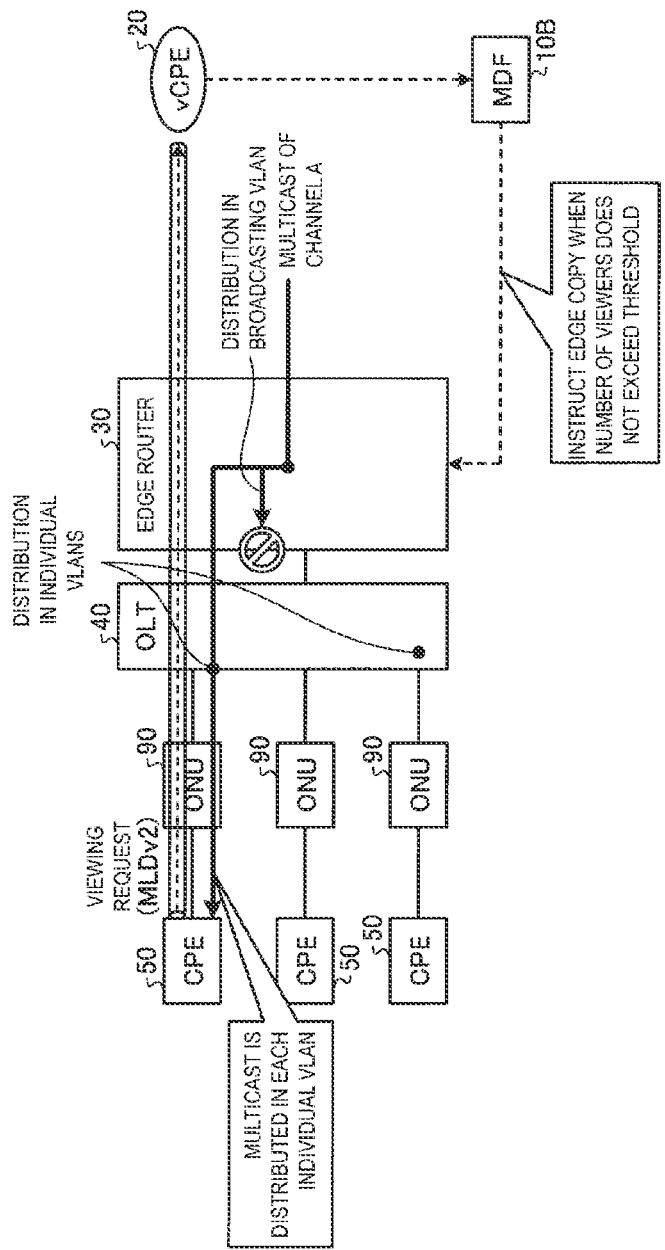
FIG. 11 is a diagram for describing processing for switching from edge copy distribution to OLT copy distribution.
Figure 12:
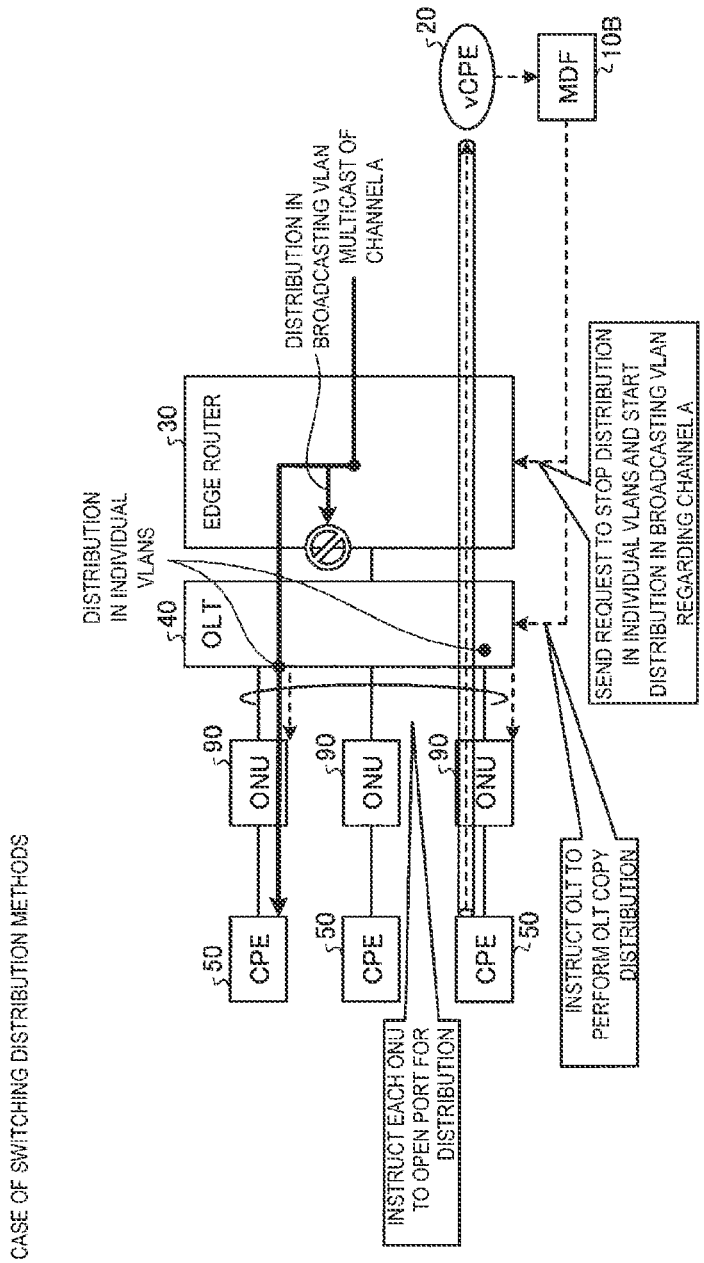
FIG. 12 is a diagram for describing processing for switching from edge copy distribution to OLT copy distribution.
Figure 13:
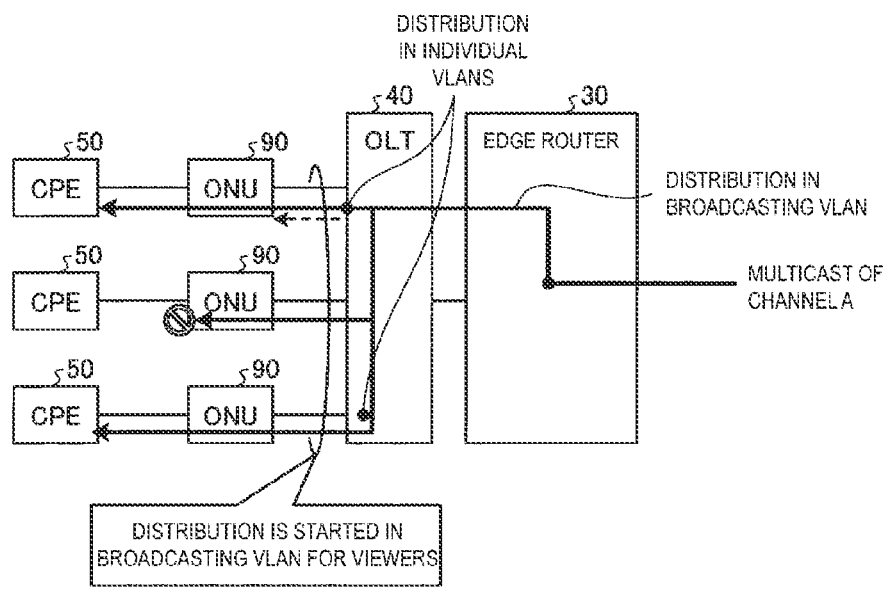
FIG. 13 is a diagram for describing processing for switching from edge copy distribution to OLT copy distribution.

Here, with reference to FIGS. 11 to 13, processing for switching from edge copy distribution to OLT copy distribution will be described. FIGS. 11 to 13 each are a diagram for describing the processing for switching from edge copy distribution to OLT copy distribution. As illustrated in FIG. 11, when the number of viewers of the channel A does not exceed a threshold, the MDF 10B instructs the edge router 30 to perform copy distribution. Then, the edge router 30 distributes multicast of the channel A in each individual VLAN.

When the number of viewers of the channel A exceeds the threshold afterwards, as illustrated in FIG. 12, the MDF 10B requests the edge router 30 to stop distribution in each individual VLAN and start distribution of the channel A in a broadcasting VLAN, and at the same time, instructs the OLT 40 to perform OLT copy distribution. The OLT 40 instructs each ONU 90 to open its port for distribution. Then, as illustrated in FIG. 13, in the case of the OLT copy distribution, the distribution to viewers is started in the broadcasting VLAN.

Figure 14:
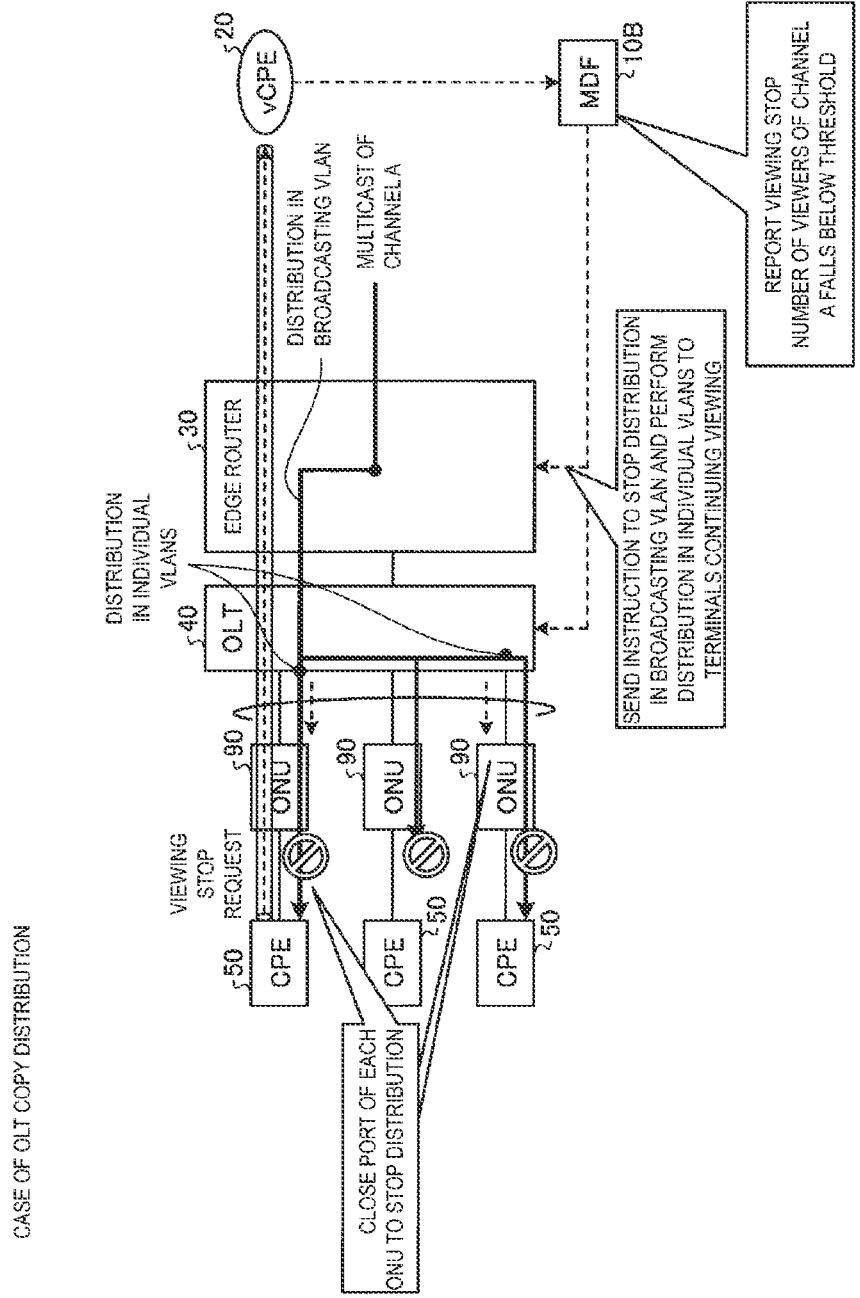
FIG. 14 is a diagram for describing processing for switching from OLT copy distribution to edge copy distribution.
Figure 15:
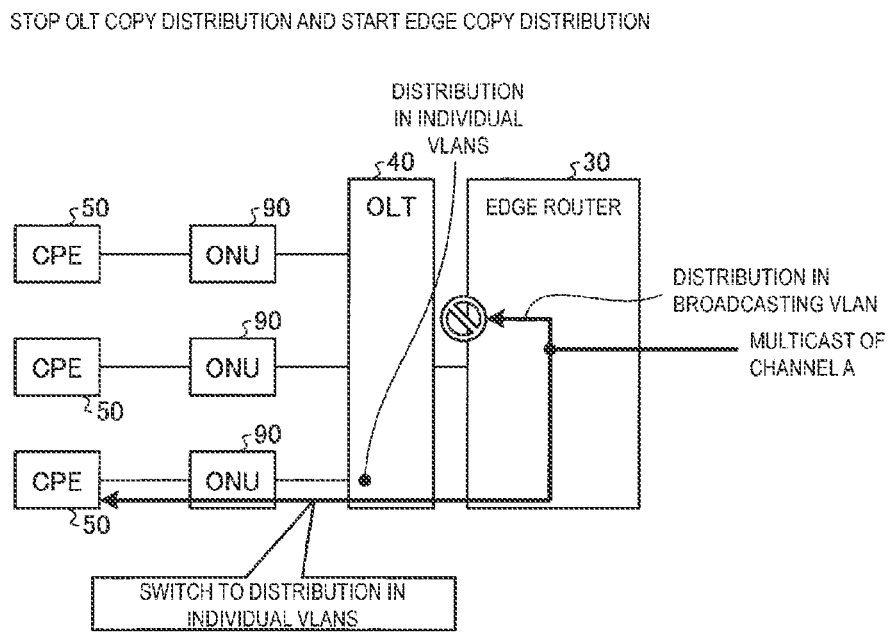
FIG. 15 is a diagram for describing processing for switching from OLT copy distribution to edge copy distribution.

Next, with reference to FIGS. 14 and 15, processing for switching from OLT copy distribution to edge copy distribution will be described. FIGS. 14 and 15 each are a diagram for describing the processing for switching from OLT copy distribution to edge copy distribution. As illustrated in FIG. 14, when the number of viewers of the channel A falls below a threshold in the case of OLT copy distribution, the MDF 10B instructs the edge router 30 to stop distribution in a broadcasting VLAN and perform distribution in individual VLANs to terminals that continue viewing. The OLT 40 closes a port of each of the ONUs 90 to stop distribution. Subsequently, as illustrated in FIG. 15, in the case of OLT copy distribution, distribution is switched to distribution in individual VLANs for viewers, and multicast is thereby distributed in each individual VLAN.

Figure 16:
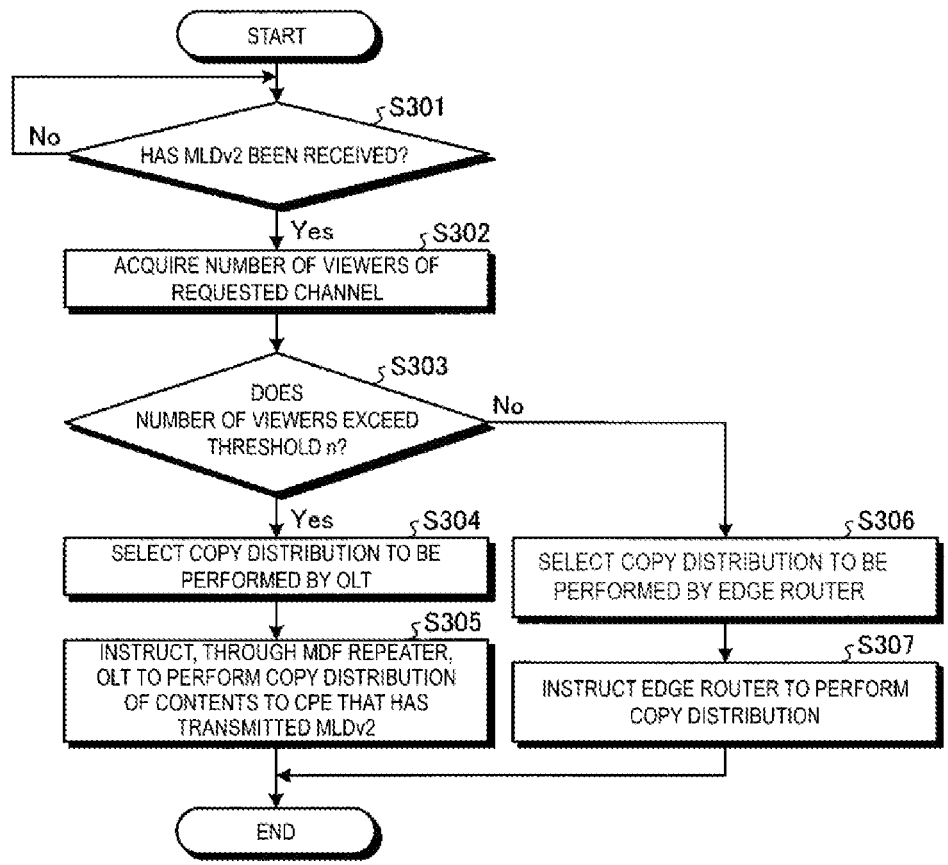
FIG. 16 is a flowchart for describing processing performed by the MDF according to the third embodiment.

Next, with reference to FIG. 16, procedures of the processing performed by the MDF 10B according to the third embodiment will be described. FIG. 16 is a flowchart for describing the processing performed by the MDF according to the third embodiment.

As illustrated in FIG. 16, when the reception unit 12a of the MDF 10B receives MLDv2 being a multicast viewing request that is received by the vCPE 20 (Yes in Step S301), the selection unit 12e acquires the number of viewers of a requested channel from the viewing information storage unit 13b (Step S302), and determines whether the number of viewers exceeds a threshold n (Step S303).

When the selection unit 12e determines that the number of viewers exceeds the threshold n (Yes in Step S303), the selection unit 12e selects our copy distribution (Step S304). Then, the instruction unit 12c instructs, through the MDF repeater 80, a target OLT 40 to perform copy distribution of contents to the CPE 50 being a transmission source of the MLDv2 (Step S305).

When the selection unit 12e determines that the number of viewers does not exceed the threshold n (No in Step S303), the selection unit 12e selects edge copy distribution (Step S306). Then, the instruction unit 12c instructs the edge router 30 to perform copy distribution of contents (Step S307).

Effects of Third Embodiment

As described above, the MDF 10B according to the third embodiment selects which of the edge router 30 and the OLT 40 is to be instructed to perform copy distribution, depending on a state of distributing contents. Thus, efficient distribution of contents can be performed, with distribution being switched between edge copy distribution and OLT copy distribution depending on a state of users' viewing of a channel.

System Configuration and the Like

Each element of each apparatus illustrated is a functional concept and does not necessarily need to be physically configured as illustrated. That is, the specific form of distribution and integration of each apparatus is not limited to the illustrated form, and the entirety or a portion of the form can be configured by being functionally or physically distributed and integrated in any unit, depending on various loads, usage conditions, and the like. Further, all or some of processing functions performed by each apparatus may be implemented by a CPU and a program analyzed and executed by the CPU, or may be implemented as hardware by wired logic.

Among the processing described in the present embodiment, all or some of the processing described as being performed automatically can be manually performed, or all or some of the processing described as being performed manually can be performed automatically by the well-known method. In addition, information including the processing procedures, the control procedures, the specific names, and various data and parameters described in the above-described document and drawings can be optionally changed unless otherwise specified.

Program

The processing executed by each apparatus described in the embodiment can be created as a program that is described in a computer-executable language. For example, the processing executed by each apparatus in the communication system according to the embodiment and a modification can be created as a program that is described in a computer-executable language. In this case, when the computer executes the program, the same effects as those of the embodiment can be obtained. Hereinafter, one example of a computer that executes the program will be described.

Figure 17:
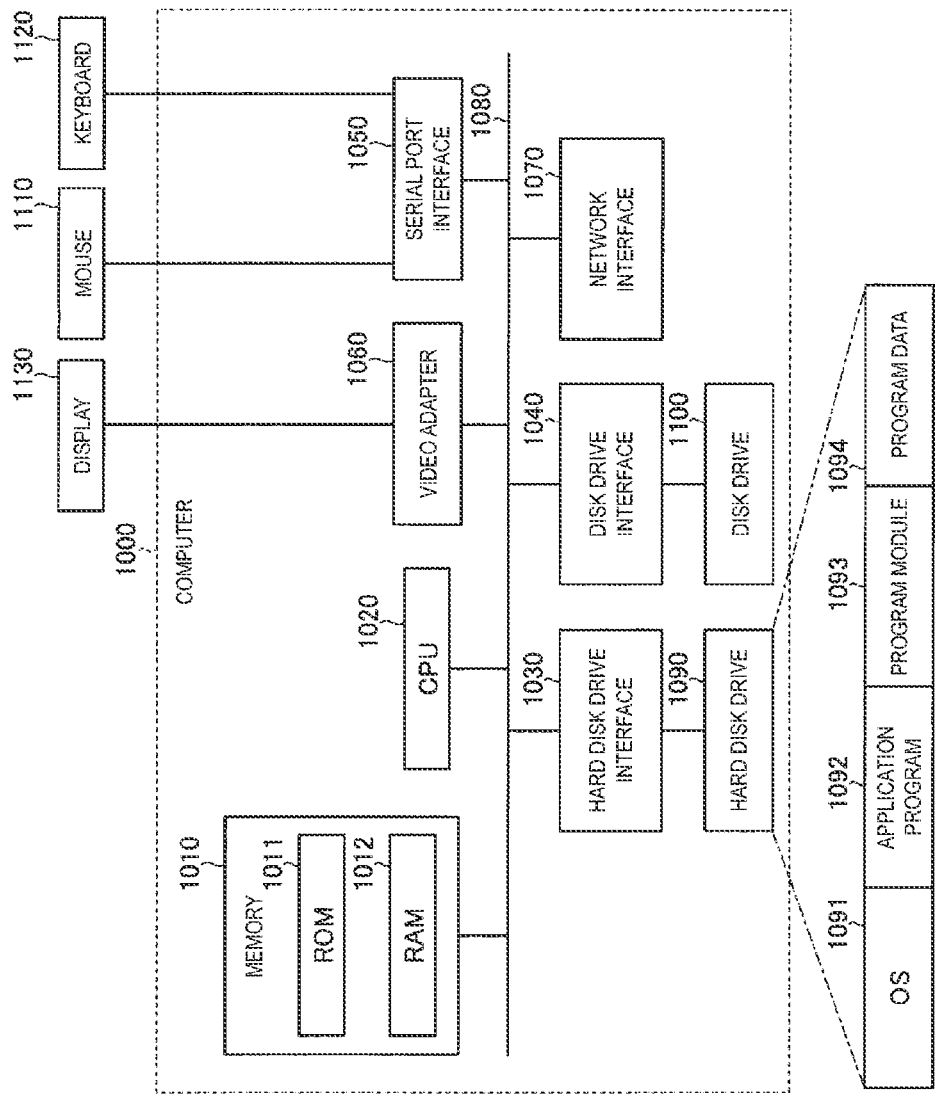
FIG. 17 is a diagram illustrating a computer that executes a program.

FIG. 17 is a diagram illustrating the computer that executes the program. A computer 1000 includes, for example, a memory 1010 and a CPU 1020. The computer 1000 includes a hard disk drive interface 1030, a disk drive interface 1040, a serial port interface 1050, a video adapter 1060, and a network interface 1070. These units are connected by a bus 1080.

The memory 1010 includes a Read Only Memory (ROM) 1011 and a RAM 1012. The ROM 1011 stores a boot program, such as Basic Input Output System (BIOS), for example. The hard disk drive interface 1030 is connected to a hard disk drive 1090. The disk drive interface 1040 is connected to a disk drive 1100. A detachable storage medium such as a magnetic disk or an optical disc is inserted into the disk drive 1100. The serial port interface 1050 is connected to, for example, a mouse 1051 and a keyboard 1052. A video adapter 1060 is connected to, for example, a display 1061.

Here, the hard disk drive 1090 stores, for example, an OS 1091, an application program 1092, a program module 1093, and program data 1094. That is, a program defining each of processes of each apparatus is implemented as the program module 1093 in which computer-executable code has been described. The program module 1093 is stored in, for example, the hard disk drive 1090. For example, the program module 1093 for executing the same processing as the functional configuration in each apparatus is stored in the hard disk drive 1090. Note that the hard disk drive 1090 may be replaced with a Solid State Drive (SSD).

Data used in the processing of the above-described embodiment is stored in, for example, the memory 1010 or the hard disk drive 1090, as the program data 1094. In addition, the CPU 1020 reads and executes the program module 1093 and the program data 1094 stored in the memory 1010 and the hard disk drive 1090 to the RAM 1012 as necessary.

Note that the program module 1093 and the program data 1094 are not limited to being stored in the hard disk drive 1090, and may be stored, for example, in a removable storage medium, and read by the CPU 1020 via the disk drive 1100 or its equivalent. Alternatively, the program module 1093 and the program data 1094 may be stored in another computer connected via a network or a WAN. In addition, the program module 1093 and the program data 1094 may be read by the CPU 1020 from another computer through the network interface 1070.

REFERENCE SIGNS LIST 10, 10A, 10B MDF
11 Communication processing unit
12 Control unit
12a Reception unit
12b Determination unit
12c Instruction unit
12d Storing unit
12e Selection unit
13 Storage unit
13a Communication information storage unit
13b Viewing information storage unit
20 vCPE
30 Edge router
40 OLT
50 CPE
60 STB
70 Content server
80 MDF repeater
90 ONU

The invention claimed is:

1. A reporting apparatus comprising:
a reception unit, including one or more processors, configured to receive a multicast viewing request received by a virtual customer premises equipment (CPE) connected to a CPE via a tunnel;
a storing unit, including one or more processors, configured to store, into a storage unit, numbers of viewers of contents being distributed to a plurality of pieces of the CPE by using the multicast viewing request received by the reception unit;
a selection unit, including one or more processors, configured to select a type of device for performing content distribution based on the numbers of viewers stored in the storage unit;
a determination unit, including one or more processors, configured to determine, based on the selected type of device, a communication device accommodating the CPE being a transmission source of the multicast viewing request, when the multicast viewing request is received by the reception unit; and
an instruction unit, including one or more processors, configured to instruct the communication device determined by the determination unit to perform copy distribution of contents to the CPE being the transmission source of the multicast viewing request.

2. The reporting apparatus according to claim 1, wherein the determination unit is configured to determine an edge router accommodating the CPE being the transmission source of the multicast viewing request, when the multicast viewing request is received by the reception unit, and
the instruction unit is configured to instruct the edge router determined by the determination unit to perform the copy distribution of the contents to the CPE being the transmission source of the multicast viewing request.

3. The reporting apparatus according to claim 1, wherein the determination unit is configured to determine an optical line terminal (OLT) accommodating the CPE being the transmission source of the multicast viewing request, when the multicast viewing request is received by the reception unit, and
the instruction unit is configured to instruct, through a repeater, the OLT determined by the determination unit to perform the copy distribution of the contents to the CPE being the transmission source of the multicast viewing request.

4. A reporting method executed by a reporting apparatus, the reporting method comprising:
receiving a multicast viewing request received by a virtual customer premises equipment (CPE) connected to a CPE via a tunnel;
storing, into a storage unit, numbers of viewers of contents being distributed to a plurality of pieces of the CPE by using the multicast viewing request received by the reception unit;
selecting a type of device for performing content distribution based on the numbers of viewers stored in the storage unit;
determining, based on the selected type of device, a communication device accommodating the CPE being a transmission source of the multicast viewing request, when the multicast viewing request is received in the receiving; and
instructing the communication device determined in the determining to perform copy distribution of contents to the CPE being the transmission source of the multicast viewing request.

5. The reporting method according to claim 4, further comprising:
determining an edge router accommodating the CPE being the transmission source of the multicast viewing request, when the multicast viewing request is received by the reception unit, and instructing the edge router determined by the determination unit to perform the copy distribution of the contents to the CPE being the transmission source of the multicast viewing request.

6. The reporting method according to claim 4, further comprising:

determining an optical line terminal (OLT) accommodating the CPE being the transmission source of the multicast viewing request, when the multicast viewing request is received by the reception unit, and instructing, through a repeater, the OLT determined by the determination unit to perform the copy distribution of the contents to the CPE being the transmission source of the multicast viewing request.

\* \* \* \* \*